United States Patent
Amey, Jr. et al.

(10) Patent No.: US 6,514,112 B1
(45) Date of Patent: Feb. 4, 2003

(54) COATED-WIRE ION BOMBARDED GRAPHITE ELECTRON EMITTERS

(75) Inventors: Daniel Irwin Amey, Jr., Durham, NC (US); Robert Joseph Bouchard, Wilmington, DE (US); Syed Ismat Ullah Shah, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/555,845

(22) PCT Filed: Dec. 8, 1998

(86) PCT No.: PCT/US98/26017

§ 371 (c)(1), (2), (4) Date: Jun. 5, 2000

(87) PCT Pub. No.: WO99/31701

PCT Pub. Date: Jun. 24, 1999

Related U.S. Application Data

(60) Provisional application No. 60/069,452, filed on Dec. 15, 1997.

(51) Int. Cl.⁷ .............................. H01J 9/02; H01J 9/04
(52) U.S. Cl. ............................. 445/50; 445/51; 445/24; 427/77; 427/78; 313/309; 313/310; 313/311
(58) Field of Search .............................. 445/24, 50, 51; 427/77, 78; 313/309, 310, 311, 336, 351

(56) References Cited

U.S. PATENT DOCUMENTS

| | | | |
|---|---|---|---|
| 3,866,077 A | * | 2/1975 | Baker et al. ................. 313/336 |
| 4,857,799 A | | 8/1989 | Spindt |
| 5,015,912 A | | 5/1991 | Spindt |
| 5,089,742 A | * | 2/1992 | Kirkpatrick et al. ........ 313/351 |
| 6,020,677 A | * | 2/2000 | Blanchet-Fincher et al. ..... 313/309 |
| 6,057,637 A | * | 5/2000 | Zettl et al. ................... 313/310 |
| 6,239,547 B1 | * | 5/2001 | Uemura et al. ............. 313/309 |
| 6,376,973 B1 | * | 2/2002 | Blanchet-Fincher et al. ..... 313/309 |

FOREIGN PATENT DOCUMENTS

| | | |
|---|---|---|
| WO | WO 94/15350 | 7/1994 |
| WO | WO 94/15352 | 7/1994 |
| WO | WO 94/28571 | 12/1994 |
| WO | WO 97/07524 | 2/1997 |

OTHER PUBLICATIONS

J.A. Floro, S.M. Rossnagel, and R.S. Robinson, "Ion–bombardment–induced wisker formation on graphite", Jul.–Sep. 1983, J.Vac.Sci.Technol. A1 (3), pp. 1398–1402.*

* cited by examiner

*Primary Examiner*—Kenneth J. Ramsey
*Assistant Examiner*—Mariceli Santiago

(57) ABSTRACT

Wire-coated graphite electron emitters are disclosed. These field emitters find particular usefulness in field emitter cathodes, display panels and lighting devices. These graphite field emitters can be formed by coating a paste comprised of graphite and glass frit onto the wire, firing the paste and bombarding the fired product with an ion beam.

12 Claims, No Drawings

COATED-WIRE ION BOMBARDED GRAPHITE ELECTRON EMITTERS

This application claims the benefit of Provisional application No. 60/069,452 filed Dec. 15, 1997.

FIELD OF THE INVENTION

This invention provides wire-coated ion bombarded graphite field emission electron emitters, a process for producing them and their use in field emitter cathodes in flat panel display screens.

BACKGROUND OF THE INVENTION

Field emission electron sources, often referred to as field emission materials or field emitters, can be used in a variety of electronic applications, e.g., vacuum electronic devices, flat panel computer and television displays, emission gate amplifiers and klystrons and in lighting.

Display screens are used in a wide variety of applications such as home and commercial televisions, laptop and desktop computers and indoor and outdoor advertising and information presentations. Flat panel displays are only a few inches thick in contrast to the deep cathode ray tube monitors found on most televisions and desktop computers. Flat panel displays are a necessity for laptop computers, but also provide advantages in weight and size for many of the other applications. Currently laptop computer flat panel displays use liquid crystals which can be switched from a transparent state to an opaque one by the application of small electrical signals. It is difficult to reliably produce these displays in sizes larger than that suitable for laptop computers or for operation over a wide temperature range.

Plasma displays have been used as an alternative to liquid crystal displays. A plasma display uses tiny pixel cells of electrically charged gases to produce an image and requires relatively high electrical power to operate.

Flat panel displays having a cathode using a field emission electron source, i.e., a field emission material or field emitter, and a phosphor capable of emitting light upon bombardment by electrons emitted by the field emitter have been proposed. Such displays have the potential for providing the visual display advantages of the conventional cathode ray tube and the depth and weight advantages of the other flat panel displays with the additional advantage of lower power consumption than the other flat panel displays.

U.S. Pat. Nos. 4,857,799 and 5,015,912 disclose matrix-addressed flat panel displays using micro-tip cathodes constructed of tungsten, molybdenum or silicon. WO 94-15352, WO 94-15350 and WO 94-28571 disclose flat panel displays wherein the cathodes have relatively flat emission surfaces.

WO 97-07524 discloses the advantages that a fibrous cathode has over a relatively flat one.

There is a need for a process for readily and economically producing wire or fiber-like electron emitters for use in fibrous cathodes.

SUMMARY OF THE INVENTION

This invention provides a process for producing a wire-coated ion bombarded graphite field emission electron emitter, which comprises:

(a) forming a layer of composite which comprises graphite particles and glass on a wire, wherein the glass adheres to the wire and to portions of the graphite particles thereby affixing the graphite particles to one another and to the wire, and (b) bombarding the surface of the layer formed in (a) with an ion beam.

Preferably, at least 50% of the surface area of the layer of composite consists of portions of graphite particles and most preferably, at least 70% of the surface area of the layer of composite consists of portions of graphite particles.

The volume per cent of graphite particles is preferably about 35% to about 80% of the total volume of the graphite particles and the glass, and most preferably about 50% to about 80% of the total volume.

Preferably, the ion beam is an argon ion beam and the argon ion beam has an ion current density of from about 0.1 mA/cm$^2$ to about 1.5 mA/cm$^2$, a beam energy of from about 0.5 keV to about 2.5 keV and the period of ion bombardment is about 15 minutes to about 90 minutes.

Preferably, the glass is a low softening point glass.

Preferably, when the layer of composite comprises graphite and glass, the process for forming the layer of composite on a wire comprises coating the wire with a paste comprised of graphite particles and glass frit and firing the paste. Various methods can be used to coat the wire. For example, the wire can be submersed in or drawn through the paste. Alternatively the paste can be brushed or sprayed onto the wire.

In addition this invention provides a process for forming a layer of composite which comprises graphite and glass on a wire, which comprises:

(a) coating a paste comprised of graphite particles and glass frit onto the wire, wherein the volume per cent of graphite particles is about 35% to about 80% of the total volume of the graphite particles and the glass frit, and (b) firing the paste to soften the glass frit and cause it to adhere to the wire and to portions of the graphite particles thereby affixing the graphite particles to one another and to the wire to produce the layer of composite, wherein at least 50% of the surface area of the layer of composite consists of portions of graphite particles.

Preferably, at least 70% of the surface area of the layer of composite consists of portions of graphite particles.

In addition this invention provides the layer of composite which comprises graphite and glass on a wire made by the above process and which can be subsequently treated to produce a field emission electron emitter. In the layer of composite which comprises graphite and glass, preferably the volume per cent of graphite particles is about 35% to about 80% of the total volume of the graphite particles and the glass, and most preferably about 50% to about 80% of the total volume.

This invention also provides electron emitters produced by the process of this invention. These electron emitters and the fibrous cathodes made therefrom are useful in vacuum electronic devices, flat panel computer and television displays, emission gate amplifiers, klystrons and lighting devices. The flat panel displays can be planar or curved.

DETAILED DESCRIPTION OF THE INVENTION

The process of the invention for producing a wire-coated ion bombarded graphite field emission electron emitter comprises forming a layer of composite which comprises graphite particles and glass on a wire. The glass adheres to the wire and to portions of the graphite particles, thereby affixing the graphite particles to one another and to the wire. It is preferable to have as much of the surface area of the layer of composite as possible consist of portions of graphite particles and to have the portions of the graphite particles at the surface of the layer of composite be free of glass. The process of this invention provides a layer of composite wherein at least 50% of the surface area of the layer of composite consists of portions of graphite particles.

As used herein, "graphite particles" means the particles of the usual hexagonal graphite, both synthetic and natural forms.

The wire can be any material to which the glass will adhere. Non-conducting wires will require a film of an electrical conductor to serve as the cathode electrode and provide means to apply a voltage to and supply electrons to the graphite particles.

Wires of metals such as nickel, tungsten, titanium, molybdenum or copper can be used. Silicon or silicon carbide can also be used. In an alternate embodiment, the core can be a metallized insulator such as tungsten coated on a non-conductive polyester, nylon or Kevlar® fiber (Kevlar® is a registered trademark of E.I. du Pont de Nemours and Company, Wilmington, Del.).

Various processes can be used to form a layer of composite which comprises graphite particles and glass on a substrate, but the preferred process is coat a paste comprised of graphite particles and glass frit onto a wire. The wire can be submersed in or drawn through the paste. Alternatively the paste can be brushed onto the wire.

The paste used will typically contain graphite particles, low softening point glass frit, an organic medium, solvent and surfactant. The role of the medium and solvent is to suspend and disperse the particulate constituents, i.e., the solids, in the paste with a proper rheology. There are a large number of such mediums known in the art. Examples of resins that can be used are cellulosic resins such as ethyl cellulose and alkyd resins of various molecular weights. Butyl carbitol, butyl carbitol acetate, dibutyl carbitol, dibutyl phthalate and terpineol are examples of useful solvents. These and other solvents are formulated to obtain the desired viscosity and volatility requirements. A surfactant can be used to improve the dispersion of the particles. Organic acids such oleic and stearic acids and organic phosphates such as lecithin or Gafac® phosphates are typical surfactants. A glass frit that softens sufficiently at the firing temperature to adhere to the wire and to the graphite particles is required. Preferably the graphite particles have least dimensions of 1 $\mu$m. If a layer of composite with higher electrical conductivity is desired, the paste also contains a metal such as silver or gold.

Based on the total weight of the paste, the paste typically contains about 40 wt % to about 60 wt % solids. These solids comprise graphite particles and glass frit or graphite, glass frit and a metal. The volume per cent of graphite particles is preferably about 35% to about 80% of the total volume of solids, most preferably about 50% to about 80% of the total volume. The graphite particle size is preferably about 0.5 $\mu$m to about 10 $\mu$m. Variations in the composition can be used to adjust the viscosity and the final thickness of the deposited material.

The paste is typically prepared by milling a mixture of graphite particles, low softening point glass frit, organic medium, surfactant and a solvent.

Various processes can be used to form the layer of composite on the wire, but the preferred process is to coat a paste comprised of graphite particles and glass frit onto the wire. The wire can be submersed in or drawn through the paste. Alternatively the paste can be brushed or sprayed onto the wire.

The paste is dried before firing, typically by heating at 125° C. for about 10 minutes. The dried paste is then fired at a temperature at or above the softening point of the glass frit. The dried paste can be fired at temperatures of about 450° C. to about 575° C. for about 10 minutes when glass with a low softening temperature is used. Higher firing temperatures can be used with wires which can endure them. It is during this firing step that the organic materials are volatilized leaving the layer of composite comprised of graphite particles and glass. Surprisingly, the graphite particles undergo no appreciable oxidation or other chemical or physical change during the firing.

Preferably the coated wire has a diameter less about 100 $\mu$m. The layer of deposited paste decreases in thickness upon firing. Preferably, the thickness of the fired layer of composite is from about 5 $\mu$m to about 30 $\mu$m, most preferably from about 5 $\mu$m to about 20 $\mu$m.

The layer of composite which comprises graphite particles and glass on a substrate can be subsequently treated to produce a field emission electron emitter. For example, the layer of composite is then subjected to ion beam bombardment under the following conditions. Beams of argon, neon, krypton or xenon ions can be used. Argon ions are preferred. Reactive gases, such as nitrogen and oxygen, can be added to the argon gas to lower the voltage for turn-on, the onset of emission, and the voltage for producing an emission current of 1 mA. For both nitrogen and oxygen, the preferred amount of substitution is preferably from about 8% to about 15%, i.e., the preferred compositions of the gases used in the ion bombardment are from about 92% Ar/8% $N_2$ to about 85% Ar/15% $N_2$ and from about 92% Ar/8% $O_2$ to about 85% Ar/15% $O_2$. The compositions 90% Ar/10% $N_2$ and 90% Ar/10% $O_2$ are especially preferred. All gas percentages are by volume. For the same percentage of substitution, nitrogen is more effective than oxygen in lowering the voltages required for emission. Oxygen ions are more chemically active and produce volatile species like CO and $CO_2$. This results in a faster etch but the finer whiskers are also consumed in the process. Nitrogen ions are not as reactive and the reaction products are not volatile.

The pressure during this bombardment is about $0.5 \times 10^{-4}$ torr ($0.7 \times 10^{-2}$ Pa) to about $5 \times 10^{-4}$ torr ($6.7 \times 10^{-2}$ Pa), preferably from about $1.0 \times 10^{-4}$ torr ($1.3 \times 10^{-2}$ Pa) to about $2 \times 10^{-4}$ torr ($2.7 \times 10^{-2}$ Pa). The ion beam bombardment is carried out at ion current densities of about 0.1 mA/cm$^2$ to about 1.5 mA/cm$^2$, preferably about 0.5 mA/cm$^2$ to about 1.2 mA/cm$^2$, with beam energies of about 0.5 keV to about 2.5 keV, preferably about 1.0 keV to about 1.5 keV. Bombardment times of about 10 minutes to 90 minutes or more can be used. Under these conditions, whiskers and cones are formed on the graphite particle surfaces and the resulting product will be a good field emission electron emitter. Ranges of the exposure times and optimal exposure times depend on the other bombardment conditions and the thickness of the layer of composite. Bombardment must be for a time sufficient to result in the formation of the whiskers and cones on the graphite particles but not so long that portions of the layer of composite are etched through to the wire since this results in a degradation of emission properties.

Any ion source can be used. Currently Kaufmann Ion Sources are the most readily available commercially.

The surface structure of the graphite particles changes significantly during the ion bombardment. As a result of etching, it is no longer smooth, but instead becomes textured and is comprised of cones. Diameters of the cones range from about 0.1 $\mu$m to about 0.5 $\mu$m. The cones develop in the direction toward the incident ion beam. When the ion beam is normal to the axis of the wire, cones form predominantly in the layer of composite along the sides of the wire. Cones are not usually present along the center of the wire, i. e., that part of the fiber which is closest to the ion beam source and they are also not present along the back of the wire, which is not exposed directly to the ion beam. Cones can be formed more uniformly around the wire by rotating the wire during the ion beam bombardment.

Transmission electron micrographs of the cones will indicate that they consist of small grains of crystalline carbon. A cone is believed to be that part of the original graphite surface which is left behind following ion beam etching.

In addition to cones, whiskers are also formed during ion bombardment of the graphite particle surfaces. Whiskers are typically located at the tips of the cones. The lengths of the whiskers can extend from 2 $\mu$m to distances of 20 $\mu$m or more. Diameters of the whiskers are in the range of 0.5 to 50 nm. The whiskers form in the direction toward the incident ion beam. The whiskers are flexible, and will move during scanning electron microscopy measurements. The whiskers grow in the same regions as do the cones, i.e., when the ion beam is normal to the axis of the wire, whiskers form predominantly along the sides of the wire. Whiskers are not usually present along the center of the wire, i. e., that part of the wire which is closest to the ion beam source and they are also not present along the back of the wire, which is not exposed directly to the ion beam.

Transmission electron micrographs of the cones will indicate that they consist of small grains of crystalline carbon. A cone is believed to be that part of the original graphite surface which is left behind following ion beam etching.

In addition to the cones, whiskers are also formed during ion bombardment of the graphite particle surfaces. Whiskers are typically located at the tips of the cones. The lengths of the whiskers can extend from 2 $\mu$m to distances of 20 $\mu$m or more. The lengths of the whiskers can be much greater than the initial dimensions of the graphite particles. Diameters of the whiskers are in the range of 0.5 to 50 nm. The whiskers form in the direction toward the incident ion beam. The whiskers are flexible, and they have been observed to move during scanning electron microscopy measurements.

For the Examples that follow a 3 cm-diameter ion gun (Kauffman Ion Source, Model II) was used to create an argon ion beam of about 2 inches diameter (5 cm) at the sample surface. This is a turbo-pumped system with a base pressure of $1\times10^{-8}$ torr ($1.3\times10^{-6}$ Pa). After the base pressure is reached, the working gas, argon, is fed into the system through a needle valve until a steady working pressure of $1\times10^{-4}$ torr ($1.3\times10^{-2}$ Pa) was achieved. The distance between the ion gun and the surface is 4–5 inches (10–12.5 cm).

Transmission electron micrographs of carbon whiskers will indicate that they are solid and consist of amorphous carbon. This material is believed to be carbon which has been removed from the original graphite particles by ion beam etching and then redeposited, initially typically at the tips of cones and then at the tips of the growing whiskers. Alternately, the whiskers may form by carbon activated by the ion beam which diffuses to the tips of the cones or whiskers. These carbon whiskers differ in structure from carbon nanotubes. Carbon nanotubes are hollow and contain shells of graphite-like sheets of carbon. Carbon whiskers are solid and exhibit no long range crystalline order in any direction. On wires coated with a layer of composite, the carbon whiskers grow in the same regions as do the carbon cones, i.e., when the ion beam is normal to the axis of the fiber, whiskers form predominantly along the sides of the fiber. Whiskers are not usually present along the center of the fiber, i.e., that part of the fiber which is closest to the ion beam source and they are also not present along the back of the fiber, which is not exposed directly to the ion beam.

Electron emission from the wires can be measured in a cylindrical test fixture. In this fixture, the wire to be tested served as the cathode and is mounted in the center of a cylinder which serves as the anode. This anode cylinder typically consists of a fine mesh cylindrical metal screen coated with a phosphor. Both the cathode and anode are held in place by an aluminum block with a semi-cylindrical hole cut therein.

The wire is held in place by two 1/16 inch-diameter stainless steel tubes, one at each end. These tubes are cut open at each end, forming an open trough in the shape of a half cylinder of length 1/2 inch and diameter 1/16 inch, and the wire is placed in the open trough that results and held in place with silver paste. The connecting tubes are held in place within the aluminum block by tight fitting polytetrafluoroethylene (PTFE) spacers, which serve to electrically separate the anode and cathode. The total length of exposed wire is generally set at 1.0 cm, although shorter or longer lengths could be studied by controlling the placement of the holder tubes. The cylindrical screen mesh cathode is placed in the semi-cylindrical trough in the aluminum block and held in place with copper tape. The cathode is in electrical contact with the aluminum block.

Electrical leads are connected to both the anode and cathode. The anode is maintained at ground potential (0 V) and the voltage of the cathode is controlled with a 0–10 kV power supply. Electrical current emitted by the cathode is collected at the anode and measured with an electrometer. The electrometer is protected from damaging current spikes by an in-series 1 M½ resistor and in-parallel diodes which allows high current spikes to bypass the electrometer to ground.

Samples for measurement of length about 2 cm are cut from longer lengths of wire samples. With the flexible stainless steel screen with phosphor removed, they are inserted into the cylindrical troughs of the two holder arms. Silver paste is applied to hold them in paste. The silver paste is allowed to dry and the phosphor screen is reattached and held in place with copper tape at the two ends. The test apparatus is inserted into a vacuum system, and the system is evacuated to a base pressure below $1\times10^{-6}$ torr ($1.3\times10^{-4}$ Pa).

Emission current is measured as a function of applied voltage. Electrons emitted from the cathode create light when they strike the phosphor on the anode. The distribution and intensity of electron emission sites on the coated wire are observed by the pattern of light created on the phosphor/wire mesh screen.

What is claimed is:

1. A process for producing a field emission electron emitter, which comprises:

(a) forming a layer of composite which comprises graphite particles and glass on a wire, wherein the glass adheres to said wire and to portions of said graphite particles thereby affixing said graphite particles to one another and to said wire; and (b) bombarding the surface of the layer formed in (a) with an ion beam which comprises ions of argon, neon, krypton or xenon for a time sufficient to form whiskers on said graphite particles.

2. The process of claim 1, wherein said ion beam comprises ions of argon.

3. The process of claim 2, wherein said ion beam further comprises ions of nitrogen.

4. The process as in any one of claims 1 or 3, wherein at least 50% of the surface area of said layer of composite consists of portions of said graphite particles.

5. The process of claim 4, wherein at least 70% of the surface area of said layer of composite consists of portions of said graphite particles.

6. The process as in any one of claims 1 or 3, wherein the volume percent of said graphite particles is about 35% to about 80% of the total volume of said graphite particles and said glass.

7. The process of claim 6, wherein the volume percent of said graphite particles is about 50% to about 80% of the total volume of said graphite particles and said glass.

8. The process of claim 3, wherein the ion beam gas is from about 85 to about 92 volume percent argon and from about 8 to about 15 volume percent nitrogen.

9. The process of claim 2, wherein said ion beam further comprises ions of oxygen.

10. The process as in any one of claims 2, 3, 8, or 9, wherein said ion beam has an ion current density of from about 0.1 mA/cm$^2$ to about 1.5 mA/cm$^2$ and a beam energy of from about 0.5 keV to about 2.5 keV and the time of ion bombardment is from about 15 to about 90 minutes.

11. The process of claim 2, wherein said layer of composite is formed by a process which comprises:

(a) screen printing a paste comprised of graphite particles and glass frit onto said wire, wherein the volume percent of said graphite particles is about 35% to about 80% of the total volume of said graphite particles and said glass frit; and (b) firing the dried paste to soften said glass frit and cause it to adhere to said wire and to portions of said graphite particles affixing said graphite particles to one another and to said wire to produce said layer of composite.

12. The process of claim 11, wherein said paste is comprised of from about 40 wt % to about 60 wt % solids comprised of graphite particles and glass frit, the weight percentage being based on the total weight of said paste.

* * * * *